July 18, 1933.  W. THORNER  1,918,788
SYSTEM FOR PROJECTING MOTION PICTURES
Filed July 15, 1930  4 Sheets-Sheet 2

Inventor
Walther Thorner
by Franz Reinhold
Attorney

July 18, 1933.  W. THORNER  1,918,788
SYSTEM FOR PROJECTING MOTION PICTURES
Filed July 15, 1930   4 Sheets-Sheet 3
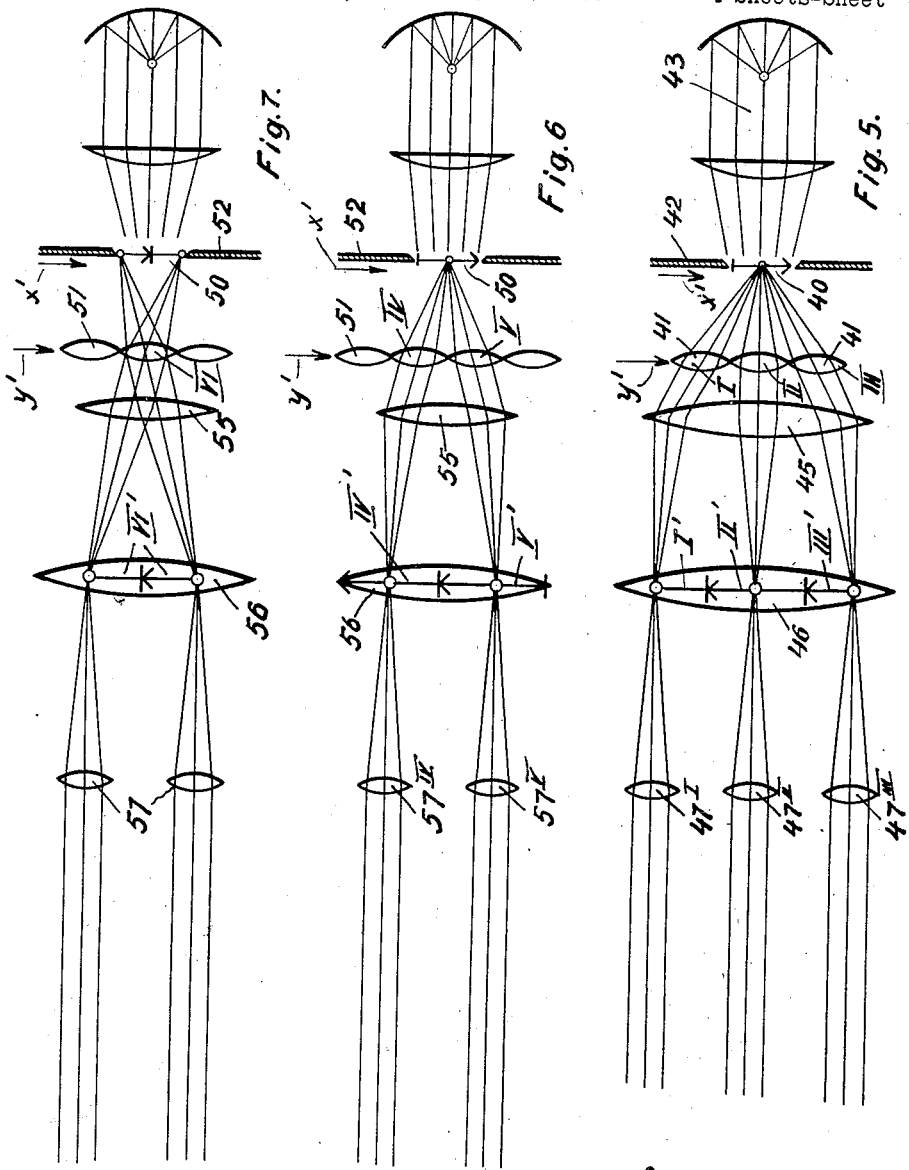
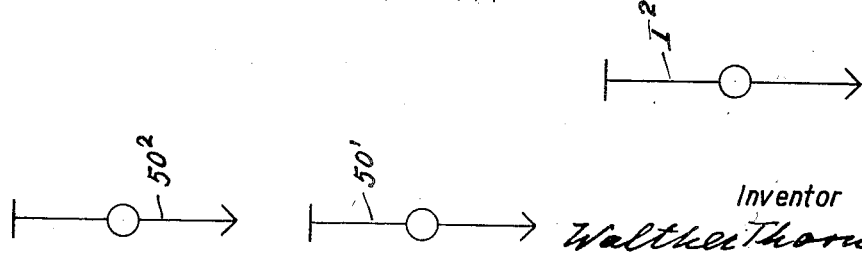
Inventor
Walther Thorner
by Franz Neinhow
Attorney July 18, 1933.  W. THORNER  1,918,788

SYSTEM FOR PROJECTING MOTION PICTURES

Filed July 15, 1930  4 Sheets-Sheet 4

Inventor
Walther Thorner
by Frank Reinhold
Attorney

Patented July 18, 1933

1,918,788

UNITED STATES PATENT OFFICE

WALTHER THORNER, OF BERLIN, GERMANY

SYSTEM FOR PROJECTING MOTION PICTURES

Application filed July 15, 1930, Serial No. 468,022, and in Germany June 2, 1928.

My invention relates to improvements in systems for projecting motion pictures and more particularly in systems comprising means for moving the film at uniform velocity across a film window and a plurality of optical means moving in accordance with the film projecting the pictures of the moving film on the same part of the screen. In projecting systems of this type hitherto proposed a main image is projected on the screen and in addition above and below the said main image additional images or partial images are projected by the lenses, because the rays from the film picture are not transmitted only by the member of the movable optical means coordinate thereto but also by a member or members which are not coordinate thereto. The object of the improvements is to provide a system which is simple in construction and operation and by means of which the said additional rays are used for increasing the luminosity of the main image, and with this object in view my invention consists in providing stationary optical means for deflecting the rays producing said additional images from their normal paths and into directions for projecting the same on the same part of the screen where the main image is produced, the optical systems being constructed so that all the images coincide. By thus projecting the additional images in register with the main image the efficiency of the system is increased, because those rays are made use of for illuminating the screen which in systems now in use are ineffective, by producing undesirable additional images.

Figure 4:
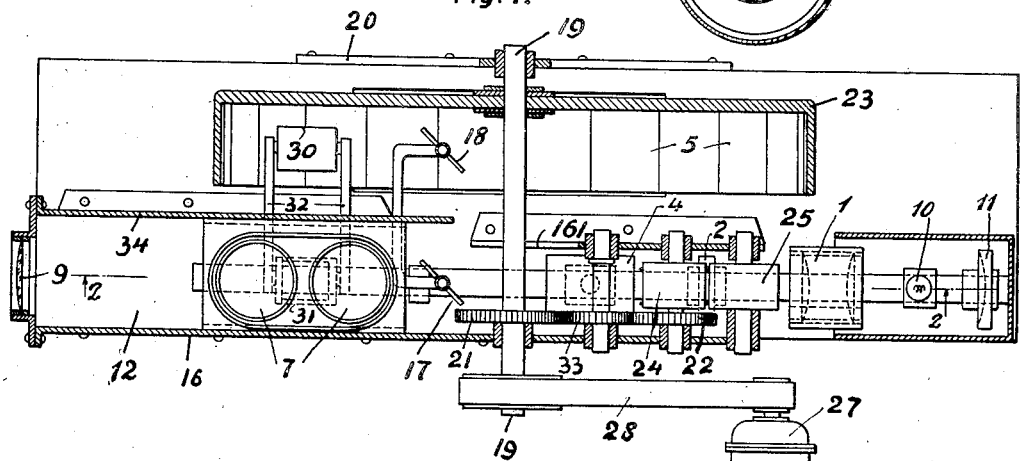

For the purpose of explaining the invention several examples of projection systems embodying the same have been shown in the accompanying drawings in which the same reference characters have been used in all the views to indicate corresponding parts. In said drawings Fig. 1 is a diagram showing my invention as embodied in a system comprising a series of revolving reflectors disposed angularly of one another to provide a polygon, the said reflectors compensating the uniform movement of the film so as to produce a stationary image on the screen, Fig. 2 is a sectional elevation taken on the line 2—2 of Fig. 4 of an apparatus embodying the principle illustrated in Fig. 1, Fig. 3 is a sectional elevation taken on the line 3—3 of Fig. 2, Fig. 4 is a sectional plan view taken on the line 4—4 of Fig. 2.

Figure 8:
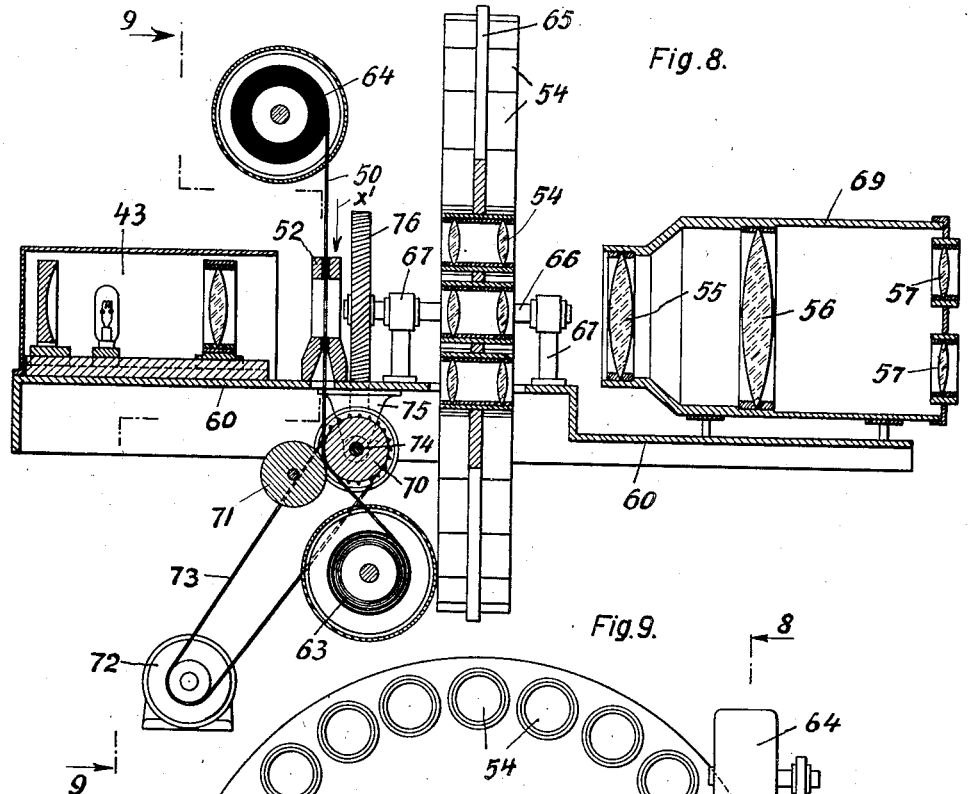
Figure 9:
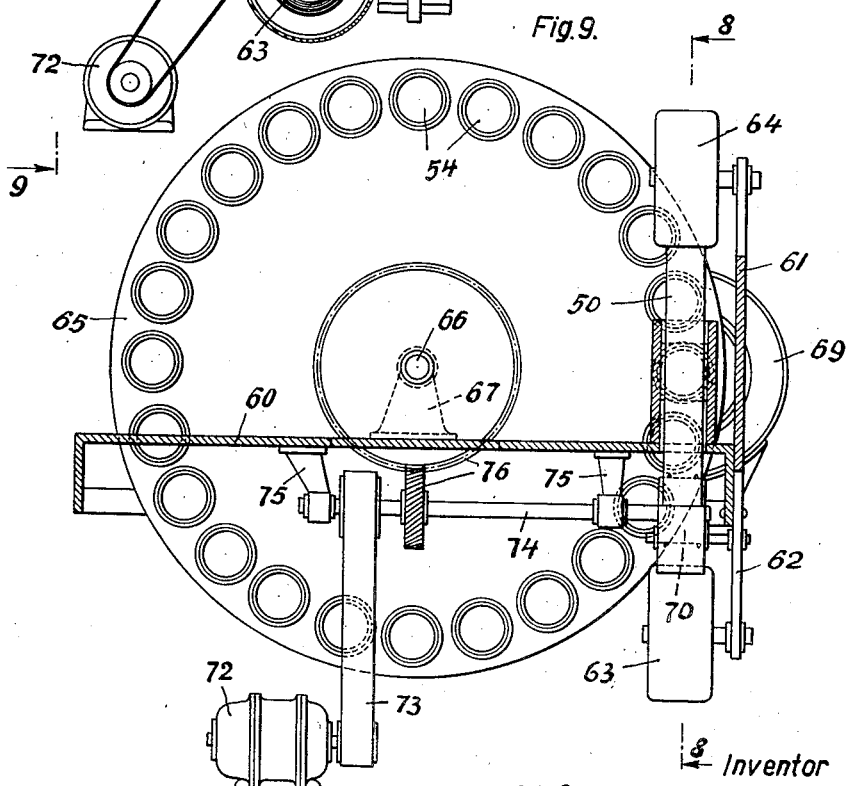

Fig. 5 is a diagram illustrating the invention as embodied in a system comprising a series of lenses moving in front of the film window, Fig. 6 is a diagram illustrating a modification of the system shown in Fig. 5, Fig. 7 is a similar diagram showing the film and the series of lenses in different positions, Fig. 8 is a sectional elevation taken on the line 8—8 of Fig. 9 and showing a practical embodiment of the system shown in Figs. 6 and 7, and Fig. 9 is a sectional elevation taken on the line 9—9 of Fig. 8.

Figure 1:
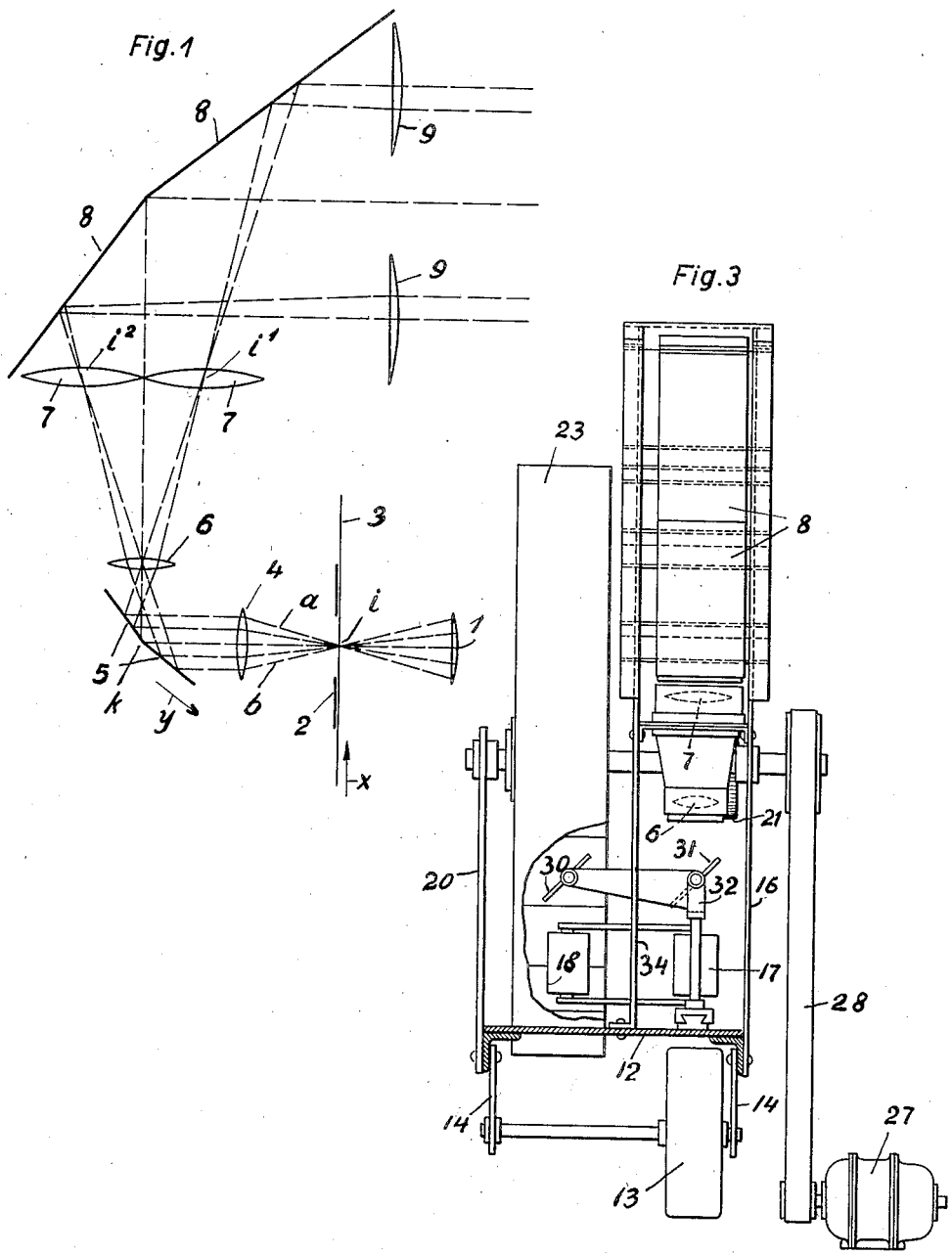
Figure 2:
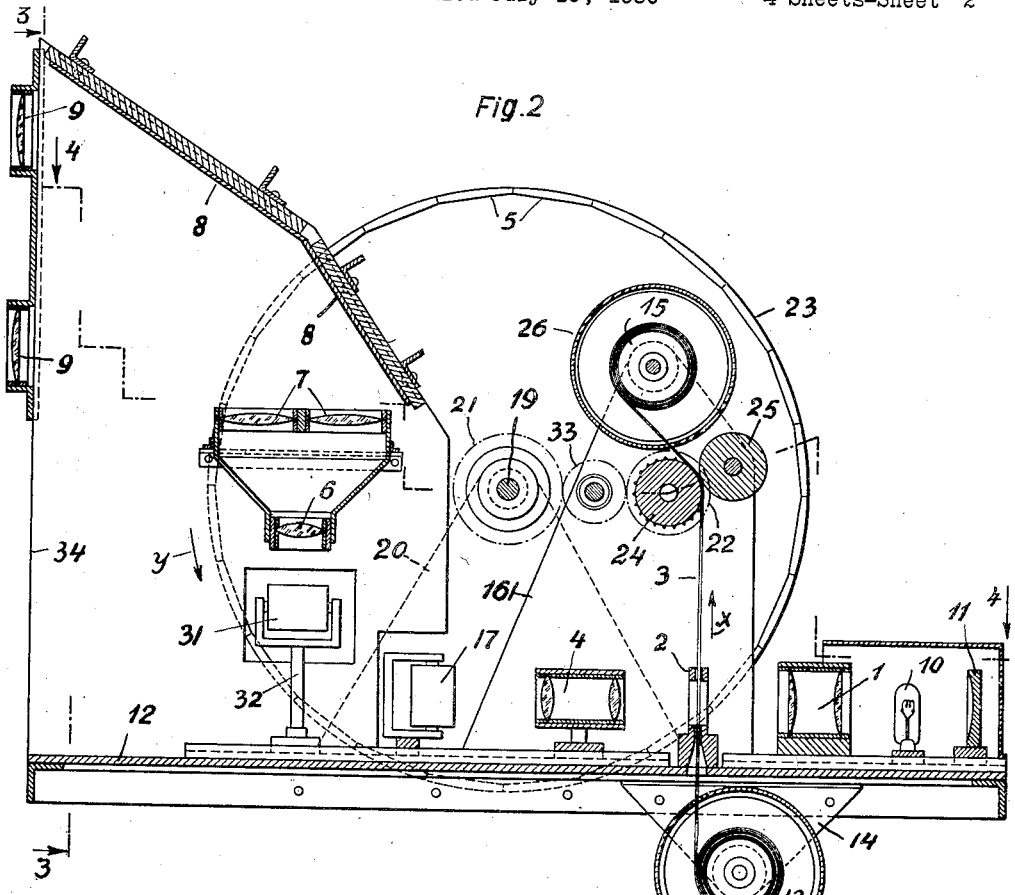

Referring now to the example illustrated in Fig. 1 my improved system comprises a source of light represented in the diagram by a condenser 1, a window 2 having a film 3 moving across the same at uniform velocity and in the direction of the arrow $x$, an objective 4 and a series of reflectors 5 disposed angularly of one another to provide a polygon and revolving at uniform velocity in accordance with the velocity of the film 3 in the direction of the arrow $y$, the figure showing only two of the said reflectors. So far the system is known in the art.

In front of the series of reflectors 5, 5 a positive lens 6 and a pair of positive lenses 7, 7 are provided, and in front of the lenses 7, 7 there are two stationary reflectors 8 disposed at the same angle relatively to each other as the reflectors 5, 5, the said reflectors throwing the rays through a pair of objectives 9 on the screen. In addition to the members shown in Fig. 1 reflectors are provided respectively between the objective 4 and the reflectors 5, 5 and between the reflectors 5, 5 and the objective 6 for directing the rays into and out of the rotary polygon provided by the reflectors 5, 5. These reflectors have not been shown in Fig. 1, but they will be described with reference to Figs. 2—4.

It may be assumed that a picture of the film 3 is in median position relatively to the window 2. From the said picture rays are projected through the system of lenses, two of the said rays emanating from the center $i$ of the picture having been indicated $a$ and $b$. The said rays $a$ and $b$ impinge on the centers of the reflectors 5, 5 and they are made convergent thereby so as to intersect in the center of the objective 6. In front of the said objective the rays are again divergent, and they produce images of the center $i$ of the film picture in or near the lenses 7, 7, the said images being shown at $i^1$ and $i^2$. The lenses 7, 7 are located substantially in the focal plane of the objective 6. The rays passing through the lenses 7, 7 impinge on the reflectors 8, 8, and they are made thereby parallel or slightly convergent, so that they intersect on the screen. Thus a single image of the film is produced on the screen. The movement of the polygonal reflector 5, 5 must be timed so that with a picture of the film in median position relatively to the window 2 the optical axis passing through the center of the picture intersects the edge $k$ bounding the reflectors 5, 5.

In Figs. 2 to 4 I have illustrated a practical embodiment of the invention, and in the said figures the parts shown in Fig. 1 have received the same reference characters.

The condenser 1, the window 2, the lenses 4, the reflectors 8, 8 and the lenses 9, 9 are disposed in front of the series of reflectors 5 mounted internally on a polygonal drum 23. The condenser 1, an electric lamp 10, a concave reflector 11, the window 2 and the lens system 4 are mounted on a table 12. In addition the said table provides a support for the mechanism for continuously moving the film 3 across the window 2. In the example shown in the figures the said mechanism comprises a spool 13 supplying the film and mounted on brackets 14, a spool 15 and feed wheels 24 and 25 mounted on uprights 16 and 161; and the feed wheels are connected with suitable mechanism for imparting continuous movement thereto. Further, on the said table 12 a pair of reflectors 17 and 18 are mounted which are disposed at angles of 45° relatively to the optical axis of the system comprising the condenser 1 and the lens system 4, and which are disposed so that the rays passing through the lens system 4 are directed into the drum 23 carrying the series of reflectors 5 and on the said reflectors.

The drum 23 having the reflectors 5 mounted therein is secured to a shaft 19 mounted on the upright 16 and an upright 20. The drum 23, the feed wheels 24 and 25 and the spool 15 are driven in unison from the same source of power by means of gear wheels 21, 33, 22 and 26, and the shaft 19 is driven from an electro-motor 27 by means of a belt 28.

On the table 12 two reflectors 30 and 31 are mounted in position for deflecting the rays reflected by the mirrors 5 in upward direction and out of the drum 23, and the said reflectors are secured to uprights 32.

Above the reflector 31 the system of lenses 6 and 7 is mounted on the plate 16 and a plate 34, and on the top part of the said plates the reflectors 8, 8 and the lenses 9, 9 are mounted.

The gear ratio of the gearings 21, 33, 22 and 26 is such that whenever the film is advanced one step, that is a length corresponding to the distance between the centers of two successive images, the drum 23 is rotated through an angle corresponding to the distance between the centers of consecutive reflectors 5, and the reflectors are located relatively to the film so that whenever a film is in median position relatively to the window 2 the optical axis of the condenser 1 and the lenses 4 intersects the edge of a pair of adjacent reflectors 5.

In the operation of the apparatus the film is continuously moved from the spool 13 to the spool 15 in the direction indicated by the arrow $x$, and the drum 23 is continuously rotated at uniform velocity in the direction indicated by the arrow $y$. Thus the picture of the film moves continuously across the window 2, and the rays emanating therefrom and passing through the lenses 4 impinge upon the reflectors 5, 5 and 8, 8. If the optical system consisting of the lenses 6 and 7, 7, the reflectors 8, 8 and the objectives 9, 9 were omitted two images would be produced on the screen. By providing the said system the images are made to coincide on the screen.

In Fig. 5 I have shown a modification in which the rays emanating from the film 40 pass through a series of continuously moving lenses 41, and the film 40 moves across the window 42 in the same direction, the direction of the movement having been indicated in Fig. 5 by the arrows $x^1$ and $y^1$. In Fig. 5 three of the series of lenses 41 have been indicated I, II and III. The apparatus comprises a source of light 43.

By the system so far described three images are produced on the screen, first, a main image produced on the screen by the lens II and, second, two images produced at opposite sides of the main image by the lenses I and III.

For making all the images coincide on the screen a lens system of the character of a telescope is provided which consists of a large objective 45, a positive lens 46, and three small objectives $47^I$, $47^{II}$, $47^{III}$. The objective 45 produces three images of the film 40 substantially in the median plane of the lens 46, which images have been indicated I', II' and III'. As appears from the figure the outer images I' and III' are reproductions of one half of the picture of the film 40 moving across the window 42. By the objectives 47ᴵ, 47ᴵᴵ and 47ᴵᴵᴵ the images I′, II′ and III′ are reproduced on the screen, and the lenses are constructed so that the images of the outer sectional images I′, and III′ coincide with the image of the main image II′, as has been indicated at the left of Fig. 5 showing a single image I² of the picture of the film 40.

In the construction shown in Fig. 5 the lenses 41 are disposed relatively to the film 40 so that with the film picture in median position relatively to the window 42 three images I′, II′ and III′ are produced. But practically I prefer to dispose the lenses and the film relatively to each in the manner shown in Figs. 6 and 7, so that only two images are produced from the film picture.

As shown in Fig. 6 the film picture 50 is in median position relatively to the window 52, and two lenses of the movable series of lenses 51 are in position in front of the said picture, which lenses have received the characters IV and V. In front of the series of travelling lenses 51 there are large positive lenses 55 and 56, the lens 55 producing two images IV′ and V′ of the picture 50 substantially in the plane of the lens 56. In front of the lens 56 there are two objectives 57ᴵⱽ and 57ⱽ by means of which the images IV′ and V′ are projected on the screen so as to produce a single image 50′.

In Fig. 7 I have shown the film picture 50 and the travelling lenses 51 in the positions in which halves of two succeeding pictures pass through the window, and a single lens VI is disposed axially of the optical system. The said lens VI produces two images VI′ which are combined on the screen into a single image 50².

In Figs. 8 and 9 I have shown a practical embodiment of the system shown in Figs. 6 and 7. The source of light 43 and the window 52 are mounted on a table 60. On brackets 61 and 62 secured to the said table spools 63 and 64 are rotatably mounted, which cooperate with feed rollers 70 and 71 for moving the film 50 across the window 52 in the direction of the arrow $x^1$. The system of travelling lenses 54 is mounted on a disk 65 secured to a rotary shaft 66 mounted on pillars 67 rising from the table 60. On the said table the lenses 55, 56 and 57 are supported which are mounted in tubular member 69.

The feed rollers and the disk 65 are driven from an electro-motor 72 the shaft of which is connected by a belt 73 with a shaft 74 mounted in brackets 75, and the said shaft is connected by helical gear wheels 76 with the shaft 66, and it has the feed roller 70 keyed thereto. The gear ratio of the helical gear wheels 76 is such that the lenses 54 move at the proper velocity with relation to the velocity of the film 50.

I claim:

1. The herein described system for projecting motion pictures, comprising means for continuously moving a film, an optical projection system including a source of light, a series of optical rectifying means having the same path and moving continuously with the film for compensating for the movement of the film and adapted to project a plurality of simultaneous stationary images of a single picture of the film, a screen, and stationary optical means for directing the rays from one and the same film-borne picture and simultaneously transmitted by the series of rectifying means upon the same part of said screen.

2. The herein described system for projecting motion pictures, comprising means for continuously moving a film, an optical projection system including a source of light, a series of rectifying reflectors having the same path and moving continuously with the film for compensating for the movement of the film and adapted to project a plurality of simultaneous stationary images of a single picture of the film, a screen, and stationary optical means for directing the rays from one and the same film-borne picture and simultaneously transmitted by the series of rectifying means upon the same part of said screen.

3. The herein described system for projecting motion pictures, comprising means for continuously moving a film, an optical projection system including a source of light, a series of rectifying reflectors having the same path and moving continuously with the film for compensating for the movement of the film to produce a plurality of stationary images of a single picture of the film, a screen, and a pair of stationary reflectors disposed angularly of each other in position for directing the rays from said rectifying means on the same part of said screen.

4. The herein described system for projecting motion pictures, comprising means for continuously moving a film, an optical projection system including a source of light, a series of rectifying reflectors having the same path and mounted internally of a polygon and moving continuously with the film for compensating for the movement of the film to produce a plurality of stationary images of a single picture of the film, stationary optical means in the form of a telescope comprising a positive lens in position for being traversed by the pencils of rays reflected by said reflectors and a plurality of positive lenses respectively in the paths of said pencils of rays and in front of said first-named positive lens and substantially in the focal plane thereof, a pair of stationary reflectors respectively in the paths of the pencils of rays coming from said plurality of positive lenses, and objectives in front of said stationary reflectors, the said stationary reflectors being disposed at angles such that the corresponding rays reflected thereby and passing through said objectives coincide in the same points of said screen.

5. The herein described system for projecting motion pictures, comprising means for continuously moving a film, an optical projection system including a source of light, a series of optical rectifying means having the same path and moving continuously with the film for compensating for the movement of the film to produce a plurality of stationary images of a single picture of the film, stationary optical means in the form of a telescope comprising a positive lens in position for being traversed by the pencils of rays coming from said rectifying means and a plurality of positive lenses respectively in the paths of said pencils coming from said first-named positive lens and substantially in the focal plane thereof, a screen, and optical means in the paths of the rays coming from said plurality of positive lenses for directing said pencils on the same part of said screen.

6. The herein described system for projecting motion pictures, comprising means for continuously moving a film, an optical projection system including a source of light, a series of optical rectifying means in the form of positive lenses having the same path and moving continuously with the film for compensating for the movement of the film and adapted to project a plurality of simultaneous stationary images of a single picture of the film, a screen, and stationary optical means for directing corresponding pencils of rays advancing from a single film-borne picture and passing through successive positive lenses to coincidence upon the said screen.

7. The herein described system for projecting motion pictures, comprising means for continuously moving a film, an optical projection system including a source of light, a series of rectifying means in the form of positive lenses having the same path and moving continuously with the film for compensating for the movement of the film to produce a plurality of stationary images of a single picture of the film, a screen, and stationary optical means for directing corresponding pencils of rays passing through said successive positive lenses on the same part of the said screen, said optical means comprising a positive lens adapted to direct the diverging pencils of rays passing through said movable lenses on the same part of the screen, and objectives for each pencil for producing the picture of the film on the screen.

WALTHER THORNER.